C. SPIRO.
RIBBON SPOOL MECHANISM FOR TYPE WRITERS.
APPLICATION FILED FEB. 9, 1912.

1,041,184.

Patented Oct. 15, 1912.

Witnesses:
John C. Kopf
Geo. A. Lewis

Inventor
Charles Spiro
By his Attorneys

UNITED STATES PATENT OFFICE.

CHARLES SPIRO, OF NEW YORK, N. Y.

RIBBON-SPOOL MECHANISM FOR TYPE-WRITERS.

1,041,184. Specification of Letters Patent. Patented Oct. 15, 1912.

Application filed February 9, 1912. Serial No. 676,599.

*To all whom it may concern:*

Be it known that I, CHARLES SPIRO, a citizen of the United States, residing in the borough of Manhattan, city, county, and State of New York, have invented certain new and useful Improvements in Ribbon-Spool Mechanism for Type-Writers, of which the following is a full and clear specification.

My invention relates to a construction of ribbon spools of typewriters, and the means for securing them upon the ribbon spool shaft intended to facilitate the application and removal of the spool and to secure positive driving of the spool by the shaft.

In carrying out my invention I provide the ribbon spool shaft with a spring actuated latch, and form upon the hollow core or barrel of the ribbon spool one or more seats or apertures with which said latch engages.

Figure 1:
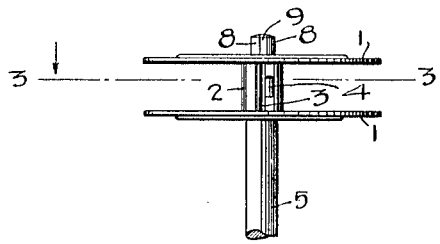
Figure 2:
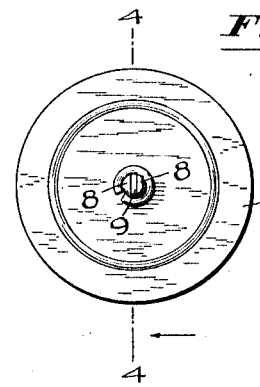
Figure 3:
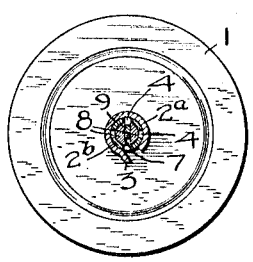
Figure 4:
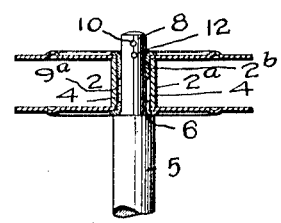
Figure 5:
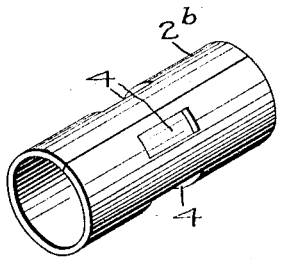
Figure 7:
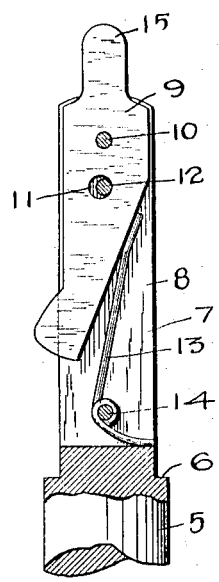
Figure 6:
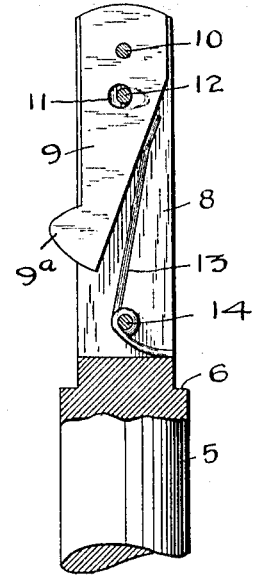

In the accompanying drawings: Figure 1 is an elevation of a ribbon spool and shaft embodying my invention. Fig. 2 is a plan view thereof. Fig. 3 is a horizontal sectional view in the plane indicated by the line 3—3 of Fig. 1. Fig. 4 is a vertical sectional view in the plane indicated by the line 4—4 of Fig. 2. Fig. 5 is a perspective view to an enlarged scale of the hollow core or barrel of the spool detached. Fig. 6 is an elevation to an enlarged scale of the ribbon spool shaft and latch with the side of the shaft toward the observer removed. Fig. 7 is a similar view showing a modification of the form of latch.

The ribbon spool has the usual heads or flanges 1, 1 mounted upon the hollow core or barrel 2—the barrel being as shown preferably made two-part, the outer sleeve or separating member $2^a$ against which the heads 1 rest, and the inner sleeve $2^b$ of length sufficient to pass through the sleeve $2^a$ and through both heads, on the outer sides of which it is turned over to clamp the heads against the sleeve $2^a$. The sleeve $2^a$ has an out-turned lip 3 adapted to receive and hold a hook or attaching member on the end of a ribbon.

The barrel is provided, preferably at midlength as shown and preferably extending only through the inner sleeve $2^b$, with one or more slots or seats 4 to coöperate with the latch to be presently described. Preferably a plurality of such slots are used, to facilitate the quick engagement of the latch with the barrel.

The upper end of the ribbon spool shaft 5 is shouldered at 6 to provide a seat for the spool and is slotted vertically at 7, providing the two parallel cheeks 8, 8 between which in the slot 7 is arranged the latch 9 having the nose or projection $9^a$. The latch is pivoted on a pin 10 near the upper end of the shaft and has at 11 a slot or hole engaging a pin 12 on the shaft. A spring 13 fastened to the shaft by pin 14 and bearing at its lower end against the bottom of the slot 7, bears at its upper end against the rear of the latch below its pivot so as to tend to force the nose of the latch out beyond the surface of the shaft.

When the spool is slipped onto the shaft, its barrel forces in the nose of the latch until it reaches the plane of the slot or slots 4—into one of which the nose enters—either directly or after a slight rotation of the spool and the spool is then held from longitudinal motion on the shaft and caused to rotate therewith. In the form of the invention shown in Fig. 7, a finger piece 15 is formed on the latch to enable the latch to be manually disengaged from the spool, this form being adapted to a construction in which the lower cam face of the nose $9^a$ is abrupt as compared with the upper cam face of said nose, so as to hold the spool on the shaft with some positiveness when in position, while permitting it to be more easily slid to position. In the form of the invention shown in Fig. 6 in which the retraction of the latch is caused by the engagement of the upper cam face of the nose $9^a$ with the end of a slot 4 when the spool is lifted off or put on, the reverse relation of the cam surfaces of the nose, is preferable.

It will be noted that the construction provides means for holding the spool upon the shaft in which the engaging parts are entirely hidden within the spool and in which when the spool is in position it is engaged positively with the shaft as to rotatory motion, but capable of being quickly and easily placed on and removed from the shaft by longitudinal motion.

What I claim is:

The combination of a ribbon-spool shaft, slotted at its upper end, a latch pivoted in the slot of the shaft, one of said members having a pin and the other a slot for limiting the movement of the latch, a spring arranged to press a portion of the latch beyond the surface of the shaft, and a ribbon spool slotted to receive such projecting part of the latch.

CHARLES SPIRO.

Witnesses:
H. H. KNIGHT,
M. G. CRAWFORD.